C. B. VERONEE.
Coffee-Pot.
No. 226,465.                    Patented April 13, 1880.
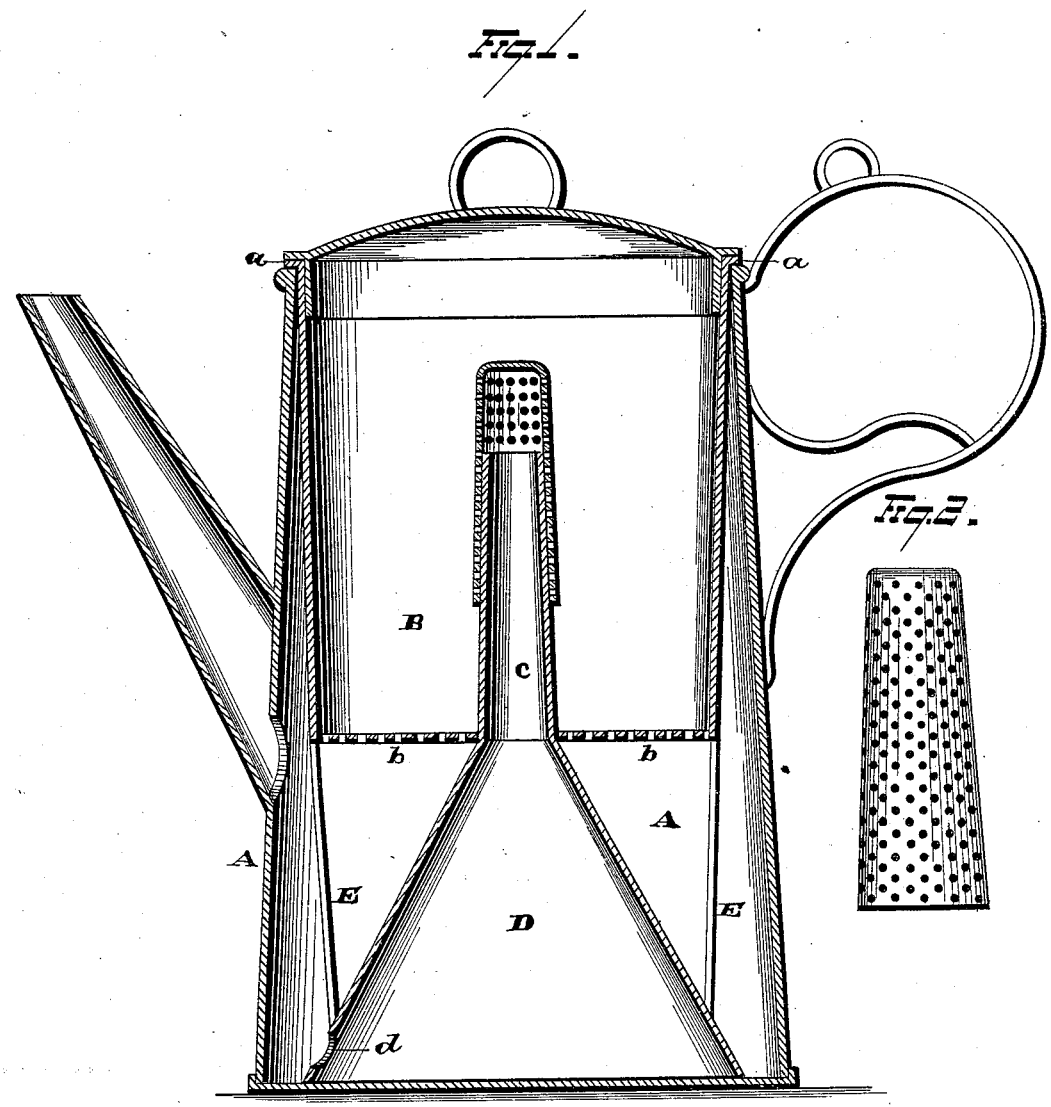

UNITED STATES PATENT OFFICE.

CORNELIUS B. VERONEE, OF ATHENS, GEORGIA.

COFFEE-POT.

SPECIFICATION forming part of Letters Patent No. 226,465, dated April 13, 1880.

Application filed January 30, 1880.

*To all whom it may concern:*

Be it known that I, CORNELIUS B. VERONEE, of Athens, in the county of Clarke and State of Georgia, have invented certain new and useful Improvements in Coffee-Pots; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates more especially to that class of coffee-pots provided with an inner receptacle, in which the ground coffee is placed, and adapted to create a current of water, which is conducted up above the central portion of the coffee, and then percolates down through the latter.

The improvement consists in a coffee-pot embodying certain features of construction and arrangements of parts, as will hereinafter be described and specified in the claim.

Referring to the drawings, Figure 1 is a central vertical sectional view of a coffee-pot embodying the improvement. Fig. 2 is a detail view of the independent perforated nozzle.

The vessel used to place the coffee-receptacle in may be a bucket or other similar article, or an ordinary coffee-pot, A.

The coffee-receptacle B is formed with a lateral outwardly-projecting flange, $a$, which fits on the upper rim of the pot. Its bottom $b$ is made perforated, and is provided with an upright central tube, $c$, whose side is imperforate. Over the open upper extremity of this tube is fitted an independent perforated nozzle, C, and a hollow cone, D, communicates with the lower extremity of the tube. Standards E connect the outer edge of the perforated bottom with the lower portion of the cone. These standards maintain the coffee-receptacle and the hollow cone in proper relative position. The water may be poured into the pot either with or without being poured over the ground coffee in its receptacle. The water, passing through one or more holes, $d$, in the lower portion of the hollow cone, enters the latter, and, being heated quickly therein, it is conducted through the tube and outward therefrom over the coffee by passage through the perforated side of the nozzle. The water then percolates down through the body of the coffee, passes out through the perforated bottom of the coffee-receptacle, thereby taking with it an extraction of the richness and flavor of the coffee. This circulation or current being continued causes the strength of the coffee to be taken up by the water, and the article poured out from the coffee-pot to be drank is free from all grounds. The imperforate side of the central tube causes the water in its upward course to be conducted above the body of the coffee before being permitted to flow through the latter. This maintains the entire mass of coffee-grounds of a uniform strength, and prevents the lower strata thereof from becoming weak, while the upper strata have not their strength appreciably affected. The perforated nozzle permits the water which has been conducted up through the tube to be ejected over and above the mass of coffee in lateral jets, so that the water may trickle down through the outer portion of the coffee-receptacle, and not wear an easy passage through the middle.

By making the nozzle independent of the imperforate tube the two can be readily washed and access be obtained for cleansing them of any impurities. Also, the nozzle, by reason of its perforated body and the great proportion of work borne thereby, is subject to becoming worn out sooner than the remaining portion of the coffee-receptacle. Hence, by being in separate piece, an old nozzle can be replaced by a new one at very little cost.

It is apparent that this invention is applicable to tea-pots as well as coffee-pots.

Having fully described my invention, what I claim as new, and desire to secure by Letters Patent, is—

In a coffee-pot, the combination of a receptacle, A, with the coffee-receptacle B, provided with perforated bottom $b$, and hollow cone D, extending from the perforated bottom $b$ to the bottom of receptacle A, and provided with opening $d$ near the lower end, braces E, secured at one end to the bottom of the coffee-receptacle and at the other to the lower portion of cone D, imperforate tube c, formed integral with cone D and extending upwardly into the coffee-receptacle, and perforated cap C, placed upon the upper end of tube c, substantially as set forth.

In testimony that I claim the foregoing I have hereunto set my hand this 22d day of January, 1880.

CORNELIUS B. VERONEE.

Witnesses:
F. W. LUCAS,
E. D. EMERY.